United States Patent [19]

Badeau

[11] Patent Number: 4,847,878
[45] Date of Patent: Jul. 11, 1989

[54] METHOD AND APPARATUS FOR DETERMINING MIRROR POSITION IN A FOURIER-TRANSFORM INFRARED SPECTROMETER

[75] Inventor: Robert R. Badeau, Stoughton, Wis.

[73] Assignee: Nicolet Instrument Corporation, Madison, Wis.

[21] Appl. No.: 175,513

[22] Filed: Mar. 31, 1988

[51] Int. Cl.[4] ........................ G01N 21/35; G01D 5/26; G01B 9/02
[52] U.S. Cl. ................................. 377/19; 250/338.1; 356/346; 377/3; 377/45; 377/53
[58] Field of Search ....................... 356/346; 318/640; 377/19, 45, 3, 53; 250/338.1

[56] References Cited

U.S. PATENT DOCUMENTS

| | | | |
|---|---|---|---|
| 3,409,375 | 11/1968 | Hubbard | 356/358 |
| 4,132,940 | 1/1979 | Schindler | 318/640 |
| 4,215,413 | 7/1980 | Stark et al. | 364/570 |
| 4,413,908 | 11/1983 | Abrams et al. | 356/346 |
| 4,429,267 | 1/1984 | Veale | 318/594 |
| 4,509,044 | 4/1985 | Yachida | 340/789 |
| 4,799,001 | 1/1989 | Burch | 318/640 |

OTHER PUBLICATIONS

Technical Description for Nicolet Model 60 SX, copyright 1983, pp. 30-35.

*Primary Examiner*—Constantine Hannaher
*Attorney, Agent, or Firm*—Lathrop & Clark

[57] ABSTRACT

The position of the moving mirror (20) in a Fourier-transform infrared spectrometer is monitored with a circuit which has an incremental counter formed of a plurality of cascaded up/down counters (82, 84, and 86) that count the pulses received by a laser detector (42) to yield a relative position count. A microprocessor (100) maintains an absolute position count by reading the counters (82, 84, and 86) and updating its absolute position count at regular intervals. A portion of the circuit is dedicated to discriminating the direction of the moving mirror (20) by gating circuitry connected to the digitized output of the laser detectors (42, 44).

20 Claims, 6 Drawing Sheets

METHOD AND APPARATUS FOR DETERMINING MIRROR POSITION IN A FOURIER-TRANSFORM INFRARED SPECTROMETER

FIELD OF THE INVENTION

The present invention relates generally to Fourier-transform infrared (FTIR) spectrometers, and particularly to circuitry for accurately determining the position of the moving mirror of an FTIR optical system.

BACKGROUND OF THE INVENTION

Interferometers, such as those of the Michelson Fourier-transform infrared (FTIR) variety, often incorporate a moving mirror that is used to vary the phase of various wavelengths of a beam of analytical radiation, e.g., infrared, that passes through a sample of material. The operation of such a Michelson interferometer FTIR spectrometer system is critically dependent upon the accurate determination of the interferometer's moving mirror position. Motion of the interferometer moving mirror is normally tracked by a positioning monochromatic light beam (usually from a laser) operating in parallel with the analytical radiation beam in the spectrometer, with the monochromatic light beam also entering the interferometer. Position information on the moving mirror is obtained by counting the fringes produced by the monochromatic light beam as it travels through the interferometer. The monochromatic light beam is made to strike an opto-electronic detector as it exits the interferometer, producing a sinusoidal output signal as the mirror moves. The sine wave has a zero crossing each time the mirror moves one-fourth of the wave length of the light of the monochromatic beam. These zero crossings may then be counted and used as the "yardstick" by which mirror position is determined.

Though this method of counting fringes in a monochromatic light beam determines mirror position to a very high degree of precision, this method requires large electronic counters to hold the many thousands of counts that are generated. When combined with the necessary timing information to determine mirror velocity and control the linear motor that drives the mirror, the implementation of these functions requires extensive hardware.

SUMMARY OF THE INVENTION

In accordance with the present invention, a microprocessor is adapted to the task of counting the fringes produced by the monochromatic light beam in an infrared spectrometer to determine mirror position. Though presently available and affordable microprocessors have not been employed in this capacity because the rate at which the counts are generated is too fast (count rates can approach 1 megahertz), the present invention allows the count to be monitored by a standard microprocessor. In accordance with the present invention, a separate, relatively low bit capacity counter is utilized to count the detected fringes and act as an incremental indicator of position. The microprocessor reads the incremental counter to determine how far the mirror has moved since the last time the counter was read. To do this unambiguously, the incremental counter must be read by the microprocessor before it advances by more than one-half of its maximum number of counts to assure that the counter is read before the count wraps around to a point where it is impossible to determine whether the counter advanced or declined to reach this new point. In the case where an 8-bit up/down counter is used as the incremental counter, for example, the incremental counter must be read before it advances by more than one-half of its maximum number of counts, which for the 8-bit up/down counter is 127. The microprocessor is therefore required to monitor the counts at a rate that is 127 times slower than if it were required to count every pulse from the fringe detector.

The microprocessor uses the information from the incremental counter to update a register in its memory that keeps track of the absolute position of the mirror. For example, if the mirror has moved ahead by 48 counts since the last time the counter was read, the microprocessor adds 48 counts to the absolute position register. If the mirror had moved backward by 34 counts, then 34 counts would be subtracted by the absolute position register. The absolute position register must be large, often 20 bits or more, but since it appears only as part of the microprocessor's memory, there is no additional hardware required for it.

The present invention thus adapts a microprocessor to the task of tracking the position of the moving mirror in an interferometer system, thereby putting such tracking under software control without sacrificing any accuracy previously obtainable when such tracking was a hardware function. This result is achieved with significantly less hardware than is required in prior systems to keep track of the mirror position. The present invention eliminates the position detectors which have previously been associated with the moving mirror in an FTIR system, minimizing hardware and assembly costs.

Further objects, features, and advantages of the invention will be apparent from the following detailed description taken in conjunction with the accompanying drawings.

DESCRIPTION OF THE PREFERRED EMBODIMENT

Figure 1:
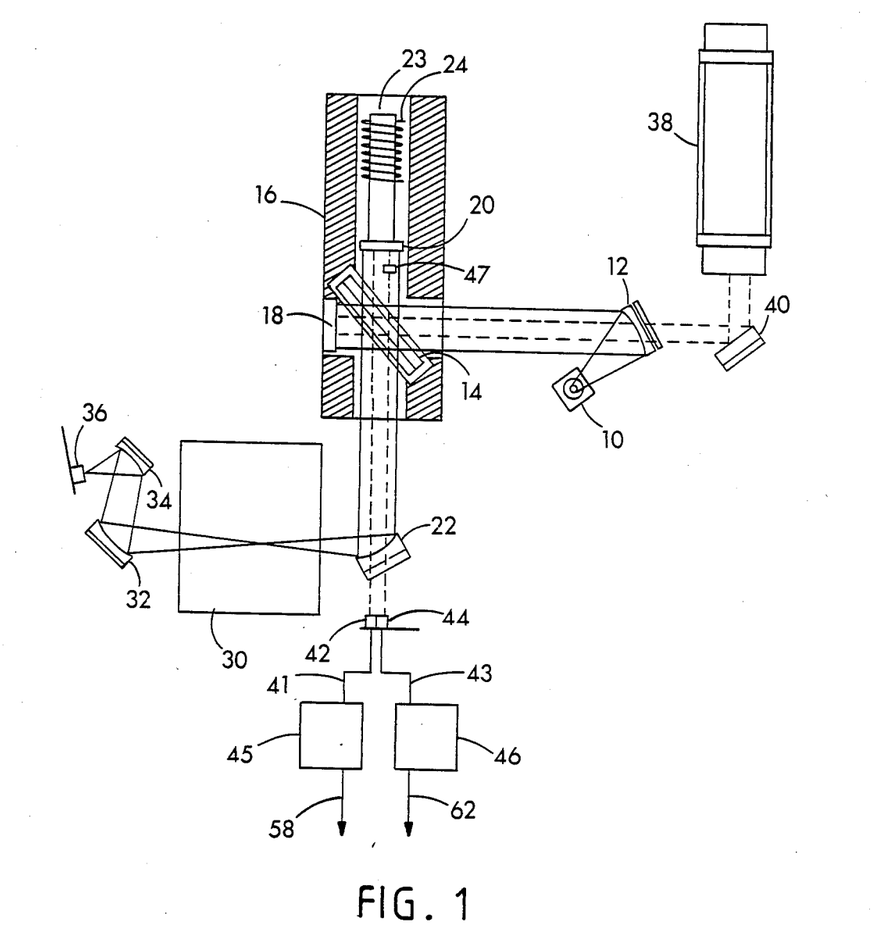
FIG. 1 is a simplified schematic view of the optical path of an FTIR spectrometer of the type which may be utilized in accordance with the present invention.

The optical layout of a typical FTIR spectrometer system utilizing a Michelson interferometer is illustrated in schematic form in FIG. 1. It is to be understood that such interferometer systems can be laid out in many geometries and that the schematic illustration of FIG. 1 is intended to be exemplary of one of many such geometries with which the present invention may be utilized.

The radiation emanating from an infrared source 10 is reflected off of a collimating mirror 12 which directs the radiation in a beam toward a beam splitter 14 located in an interferometer housing 16. The infrared from the mirror 12 which passes through the beam splitter 14 is then reflected by a reflecting mirror 18 located in the optical path of the beam coming from the mirror 12. Perpendicular to the beam path between the mirrors 12 and 8 is a beam path created by recombining infrared from the first beam with infrared partially reflected by the beam splitter 14 to a moving mirror 20 which reflects the infrared back to the beam splitter. This path extends between the moving mirror 20 and a focusing mirror 22. The moving mirror 20 moves linearly toward and away from the beam splitter 14. This motion is accomplished by mounting the moving mirror 20 on a shaft 23 which is reciprocated on a linear axis forwardly and rearwardly by a solenoidal actuator 24.

Infrared leaving the interferometer housing 16 is reflected by the focusing mirror 22 through a sample chamber 30 to focusing mirrors 32 and 34 which focus the infrared beam on a detector 36. The motion of the moving mirror 20 modulates the infrared beam which is passed through the sample chamber 30, where the beam is selectively absorbed by the sample, to cyclically produce peaks and valleys in the various wavelengths within the band of wavelengths contained in the infrared from the source 10. The information in the time varying electrical signal from the detector can be analyzed by appropriate Fourier analysis to indicate the spectral characteristics of the substance contained in the sample chamber 30.

For appropriate and accurate frequency domain information to be generated by the FTIR spectrometer system, the direction of motion, the speed of motion, and the position of the moving mirror 20 must be known so that these variables can be controlled and the mirror position correlated with the signal from the detector. For this purpose, a laser interferometer system is used to detect the motion and position of the moving mirror 20. This system consists of a laser 38 producing laser beams in two parallel channels, the output of which is directed off a reflecting mirror 40 into the light path entering the interferometer housing 16. The paths of the laser beams, indicated in dashed lines in FIG. 1, are also split by the beam splitter 14, creating an interference pattern directed toward the mirror 22. The laser interferometer output is detected by a detector 42 located behind the mirror 22. As the moving mirror 20 moves, the split beams of laser light will be recombined and will constructively and destructively interfere, thus creating a light beam from one of the two parallel channels of cyclically varying intensity, detected at the laser detector 42, with each cycle representing an increment of linear distance of movement of the moving mirror. The sinusoidally varying signal representing the intensity of the light wave detected by the laser detector 42 is carried on a line 41 and is converted to a pulse train by a conventional zero-crossing detection circuit 45 which generates a pulsed output signal on a line 58. As discussed further below, a second light detector 44 receives the recombined laser beam from the second of the two parallel channels and provides an output signal on a line 43 which is converted to a pulse train on a line 62 by a zero crossing detection circuit 46.

Figure 2:
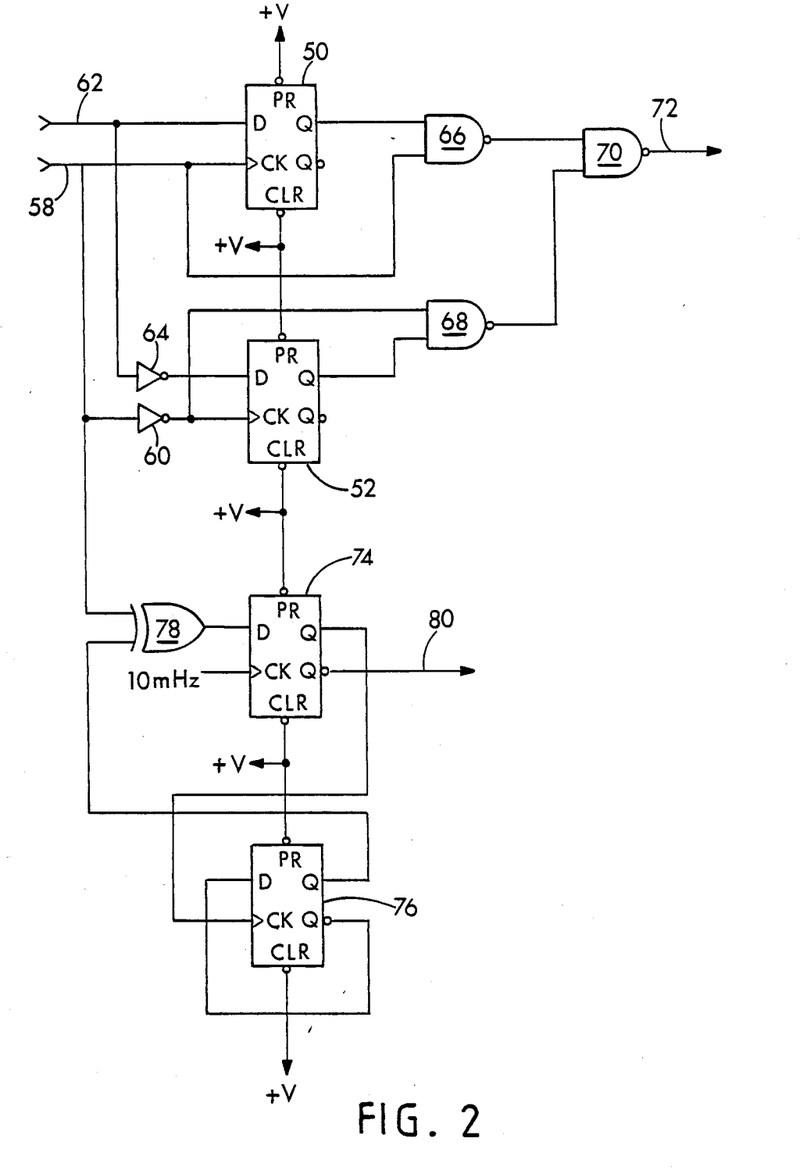
FIG. 2 is a schematic circuit diagram of that portion of the circuit of the present invention that discriminates the direction of the moving mirror.
Figure 3:
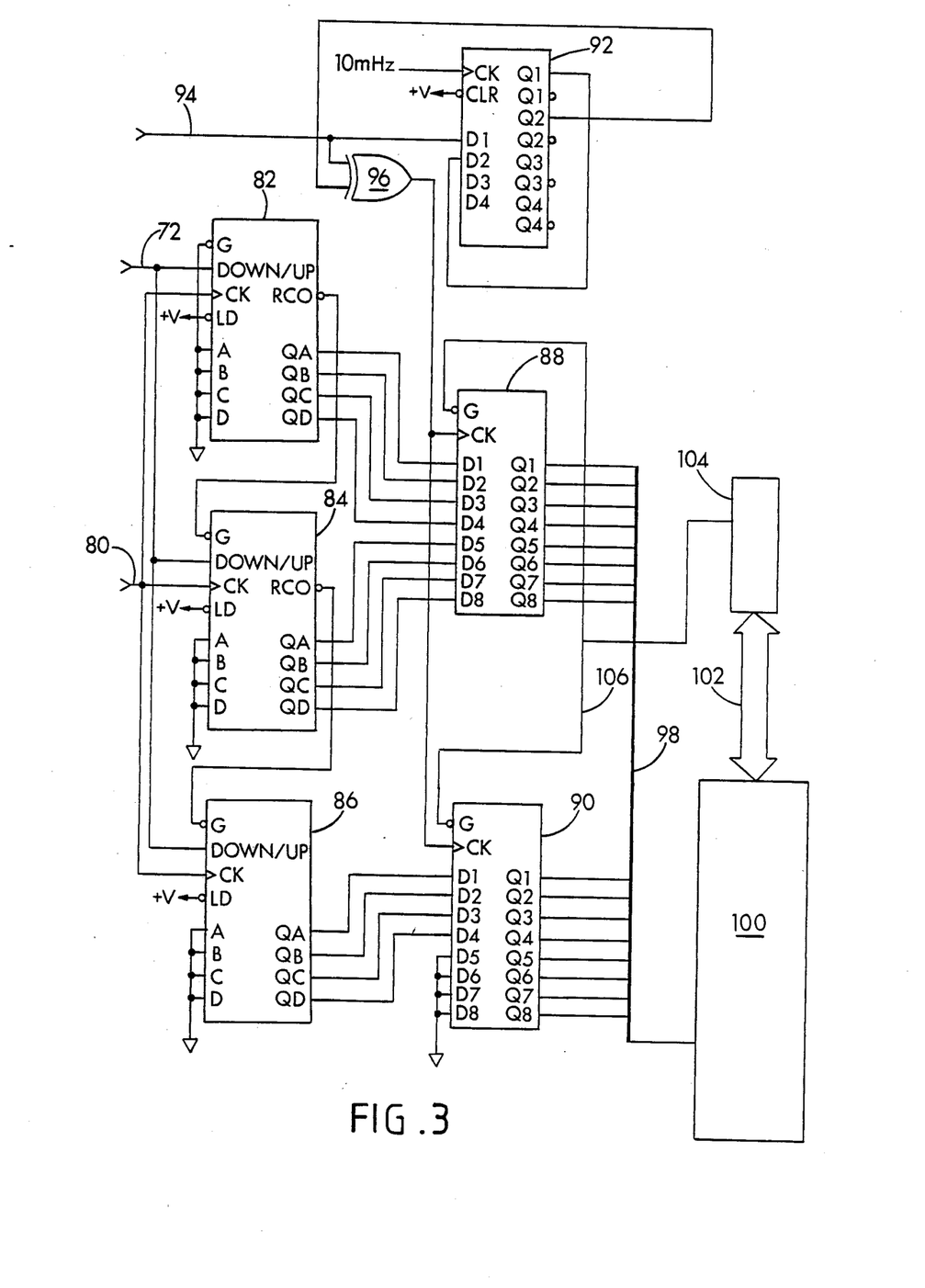
FIG. 3 is a schematic circuit diagram of the incremental mirror position counter of the present invention.

Illustrated in FIGS. 2 and 3 is the digital circuitry which tracks the position of the moving mirror in a Fourier-transform infrared (FTIR) spectrometer in accordance with the present invention. FIG. 2 shows that portion of the circuit that is dedicated to discriminating the direction of the moving mirror of the FTIR spectrometer. The direction discriminator of FIG. 2 includes two D-type flip-flops 50 and 52. Both of the flip-flops have pre-set and clear inputs tied high. The laser detector 42 and zero crossing detection circuit 45 generate a square wave output on a line 58 that is provided to the clock input of the flip-flop 50. The square wave output on the line 58 is also complemented by an inverter 60 and provided to the clock input of the flip-flop 52. The second laser detector 44 and the zero crossing detection circuit 46 generate a second square wave output signal on the line 62 that is 90° out of phase with the signal on the line 58. The laser detector 44 receives the laser beam from the second of two laser channels, this beam being directed through a one-eighth wave plate 47 which causes the laser beam to lag one-eighth of a cycle behind what the laser would be without the plate 47. Since the laser in the second channel travels through the plate 47 twice, a total phase lag of one-fourth of a cycle, or 90°, is produced. Though the circuitry of FIGS. 2 and 3 will work for any phase difference which is greater than a degree or so, the 90° phase shift here described gives the largest error margins. The signal on the line 62 is provided to the data input of the flip-flop 50 and is complemented by an inverter 64 and provided to the data input of the flip-flop 52. The non-inverting output of the flip-flop 50 and the signal on the line 58 are provided to a NAND gate 66. The non-inverted output of the flip-flop 52 and the inverted signal from the line 58 are provided to a second NAND gate 68. Outputs from the NAND gate 66 and the NAND gate 68 are provided to a NAND gate 70. The output 72 from the NAND gate 70 represents the direction of the moving mirror 20, wherein a low output on the line 72 means that the mirror is moving forward, and a high output on the line 72 signifies backward movement of the moving mirror 20.

As also shown in FIG. 2, two D-type flip-flops 74 and 76 have their pre-set and clear inputs tied high. The non-inverted output of the flip-flop 74 is provided to the clock input of a flip-flop 76. The inverted output of the flip-flop 76 is fed back to the data input of the flip-flop 76. The non-inverted output of the flip-flop 76 and the signal on the line 58 from the laser detector 42 are fed to an exclusive-or gate 78, the output of which leads to the data input of the flip-flop 74. A ten megahertz clock signal is provided from a clock oscillator (not shown) to the clock input of the flip-flop 74, acting as a system synchronizing clock. The inverting output from flip-flop 74 provides an output pulse train on the line 80 which is synchronized to the system clock, with these pulses occurring at each zero crossing of the output signal of detector 42.

As shown in FIG. 3, the circuitry for the incremental mirror position counter includes three synchronous 4-bit binary up/down counters 82, 84, and 86, each of which receive the signal on the line at 80 at their clock inputs. The up/down inputs of the counters 82, 84, and 86 receive the output on the line 72 from the NAND gate 70. When the signal on the line 72 is high, the counters 82, 84, and 86 will count up; when the signal on the line 72 is low, the counters 82, 84, and 86 will count down. An increasing count represents forward movement of the moving mirror 20 and a decreasing count represents backward movement of the moving mirror 20. The counters 82, 84, and 86 are cascaded to yield a total 12-bit capacity, with the ripple carry output of counter 82 connected to the enable input of the counter 84 and the ripple carry output of the counter 84 connected to the enable input of the counter 86. The enable input of the counter 82 and the preload bit inputs of the counters 82, 84, and 86 are grounded; the load inputs of counters 82, 84, and 86 are tied high. The four output lines of counter 82 and of counter 84 are supplied to the eight data inputs of a latch 88. The four output lines from the counter 86 are tied to the four least significant bit data inputs of a latch 90. The four remaining data inputs to latch 90 are grounded. The circuit also has a latch 92 that receives its first data bit input from a line 94 having a signal thereon that changes state every 200 microseconds. The noninverting first output bit of the latch 92, resulting from the first data input bit, is provided to the second data input of the latch 92. The noninverting second output bit resulting from the second data input bit of the latch 92 is connected to one input of an exclusive-or gate 96. The other input of the exclusive-or gate 96 receives the signal on the line 94 that changes state every 200 microseconds. The output of the exclusive-or gate 96 is provided to the clock inputs of the latches 88 and 90. The clear input of the latch 92 is tied high; the clock input of latch 92 is tied to a 10 megahertz clock signal. The connection of the latch 92 with the exclusive-or gate 96 thus serves to provide an output pulse of selected width from the exclusive-or gate 96 every 200 microseconds.

The output of the latches 88 and 90 are connected to a data bus 98 leading to a microcomputer 100, which is comprised of any of various suitable commercially available microprocessors (e.g. 68000 series) and associated RAM and ROM memories (not shown). An address bus 102 leads from the microcomputer to a bank of decoders 104. Connecting lines 106 lead from the bank of decoders 104 to the enable inputs of the latches 88 and 90.

When the spectrometer is operating, the laser detectors 42 and 44 and zero crossing detectors 45 and 46 generate square wave output signals on the lines 58 and 62 which are 90° out of phase from each other. The tying of the presets and clears on the flip-flops 50 and 52 to the high state (+V) renders the preset and clears inactive, so that the current level on the line 62 is transferred to the non-inverting output of the flip-flop 50 on the positive-going edge of the pulse on the line 58. In the flip-flop 52, the inverted pulse from the line 62 is transferred to the non-inverting output on the positive-going edge of the inverted signal on the line 58. The gating arrangements of NAND gates 66, 68 and 70 produce an output signal on the line 72 that is low when the moving mirror 20 moves ahead, and high when the moving mirror 20 moves backward.

The flip-flops 74 and 76 also have inactive presets and clears. The flip-flops 74 and 76 are connected to provide an output on the line 80 which is at twice the frequency of the signal on the line 58 to provide a pulse at each zero crossing of the signal from the laser detector 42.

The output on the line 72 is provided to the counters 82, 84 and 86, and the state of the output 72 determines whether the counters 82, 84 and 86 will count up or down, depending upon the direction of the moving mirror 20. The cascaded counters 82, 84 and 86 comprise a 12-bit capacity counter that continuously counts the pulses on the line 80. The binary count is provided to latches 88 and 90, and when the latches are enabled under the direction of the microcomputer 100 through the control lines 106, the count may be transferred to the microcomputer 100. The output data in the latches 88 and 90 is updated on each pulse that is provided to the latches 88 and 90 from the exclusive-or gate 96 at 200 microsecond intervals.

The latch count sent through the data bus 98 to the microcomputer 100 must be read by the microcomputer in an interval of time which is less than the time necessary for the counters 82, 84 and 86 to register one-half of their total number of counts. For the three counters 82, 84 and 86, totalling a 12-bit capacity, the maximum number of counts would be 4095. The microcomputer 100 must be interrupted or programmed to read the count total in the proper interval of time to discriminate which direction the mirror is moving and whether the count has wrapped around. The microcomputer is now able to count at a rate 2047 times slower than it would if the microprocessor were required to count the pulses in the signal on the line 80 itself. The microcomputer 100 therefore has time to monitor the position of the moving mirror as well as to perform other tasks involved in the operation and control of the moving mirror 20. By means known in the art, the microcomputer 100 supervises the control of the moving mirror 20 by commanding a hardware controller (not shown) when to start the mirror moving, when to change direction of movement and how fast to move. The microcomputer 100 also specifies, in real time, the gain that the hardware controller should use and can apply drive current directly, via a digital to analog converter (not shown), to effect a reset force and a turnaround force in the moving mirror 20.

Figure 4:
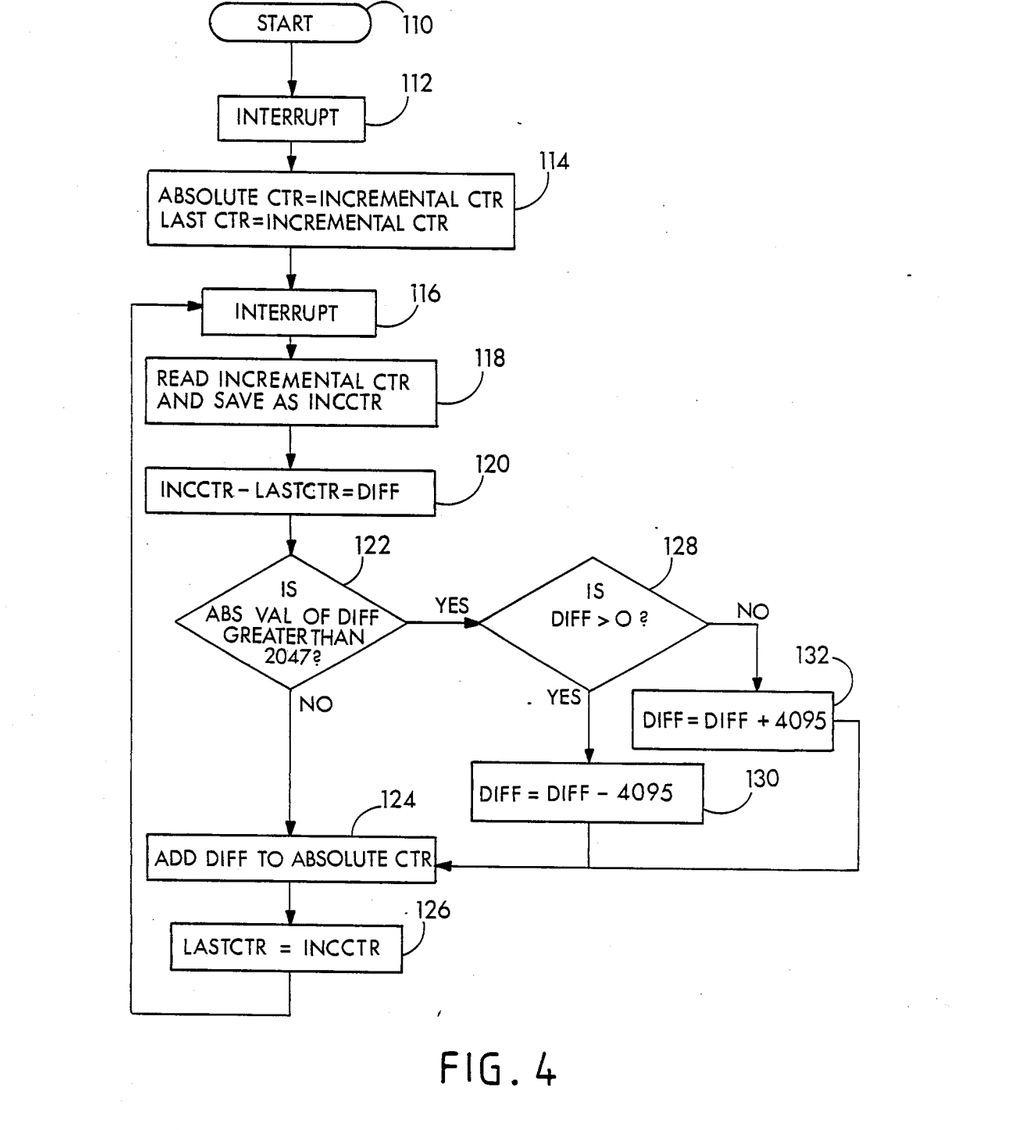
FIG. 4 is a flowchart representing the operations of the microcomputer in the updating of the absolute position register.

The microcomputer 100 uses information from the counters 82, 84, and 86 to maintain an absolute position register in its memory, the absolute position register reflecting the position of the moving mirror 20 from a fixed point. The absolute position register of the microcomputer 100 is updated on each reading by the microcomputer 100 of the incremented latch count as sent through the data bus 98. The incremented latch count is read and compared to the previous reading of the incremental latch count, and the difference between the present incremental count and the previous count is either added or subtracted to the absolute position register, depending upon the direction of the moving mirror 20. FIG. 4 shows a flowchart of the operations of the microcomputer 100 in the updating of the absolute position register. The program represented by the flowchart in FIG. 4 begins at a start 110, then waits for an interrupt 112 provided by an external command from the operator to the microcomputer 100 to initialize conditions at 114 such that the absolute count, "ABSOLUTE CTR," equals the incremental count, "INCREMENTAL CTR," held in the latches 88 and 90, and transferred to microcomputer 100 by the data bus 98. A second initial condition at 114 is that the last count read by the microcomputer 100, "LAST CTR," is set equal to the incremental count. A second interrupt at 116 begins an iterative cycle where the most recent incremental count is read by the microcomputer 100 and saved as "INCCTR" at 118. At 120, the last count, or immediately preceding incremental count, is subtracted from the most recent incremental count to yield a difference, or "DIFF." In order to determine whether the incremental synchronous counters 82, 84, and 86 have returned to zero and continued count after reaching maximum bit capacity, or whether the counters 82, 84, and 86 have returned to a maximum bit capacity when the count has decremented below zero, the program will ask at 122 if the absolute value of the difference between the most recent incremental count and the immediately preceding count is greater than 2047, which represents just over one-half of the maximum bit capacity of 4095. If not, the program will add the difference, "DIFF," to the absolute count at 124 and update the count as the most recent incremental count, "INCCTR," at 126 before the next interruption to proceed with the program at 116. If the absolute value of "DIFF" is greater than 2047, the program will check at 128 whether "DIFF" is greater than zero. If "DIFF" is greater than zero, then 4095 will be subtracted from the value of "DIFF" at 130 to yield a new "DIFF" which is then forwarded to 122. If "DIFF" is less than zero at 126, then 4095 will be added to the value of "DIFF" at 132 to yield a new "DIFF" which is then forwarded to 122.

Figure 5:
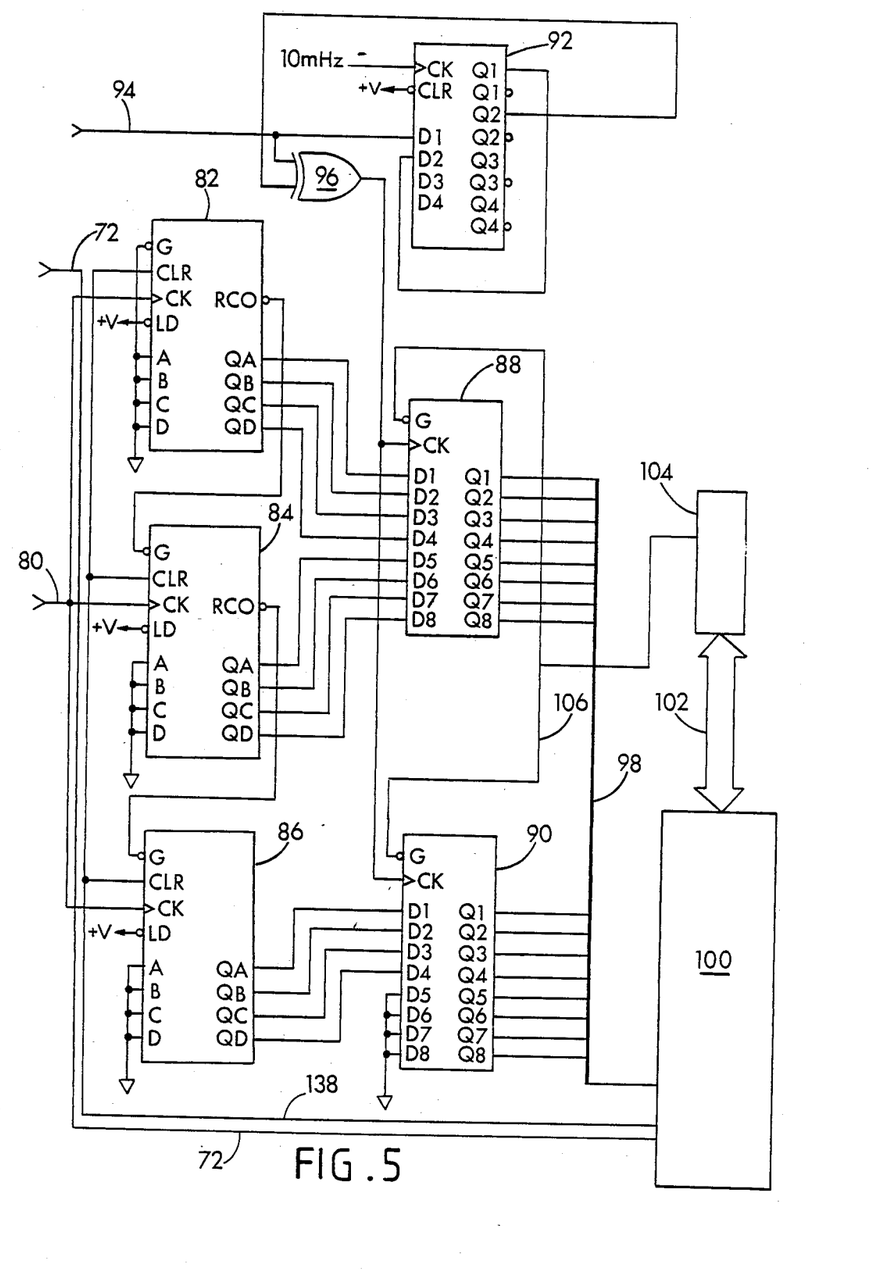
FIG. 5 is an alternate schematic circuit diagram of the incremental mirror position counter of the present invention.

Another embodiment relating to the transferring of the count from the counters 82, 84, and 86 to the microcomputer 100 is shown in FIG. 5. In this embodiment, the output 72 that represents the direction of the moving mirror communicates directly with the microcomputer 100. The counters 82, 84, and 86 count in only one direction, so the microcomputer 100 must keep track of direction changes in the moving mirror 20. To accomplish this, the microcomputer 100 updates the absolute position register and clears the counters 82, 84, and 86 with a signal provided to the counters on a line 138 every time the moving mirror 20 changes direction. Since direction changes only occur when the mirror is moving relatively slowly, the fringe count rate is not likely to exceed the processing speed of the microcomputer 100.

Figure 6:
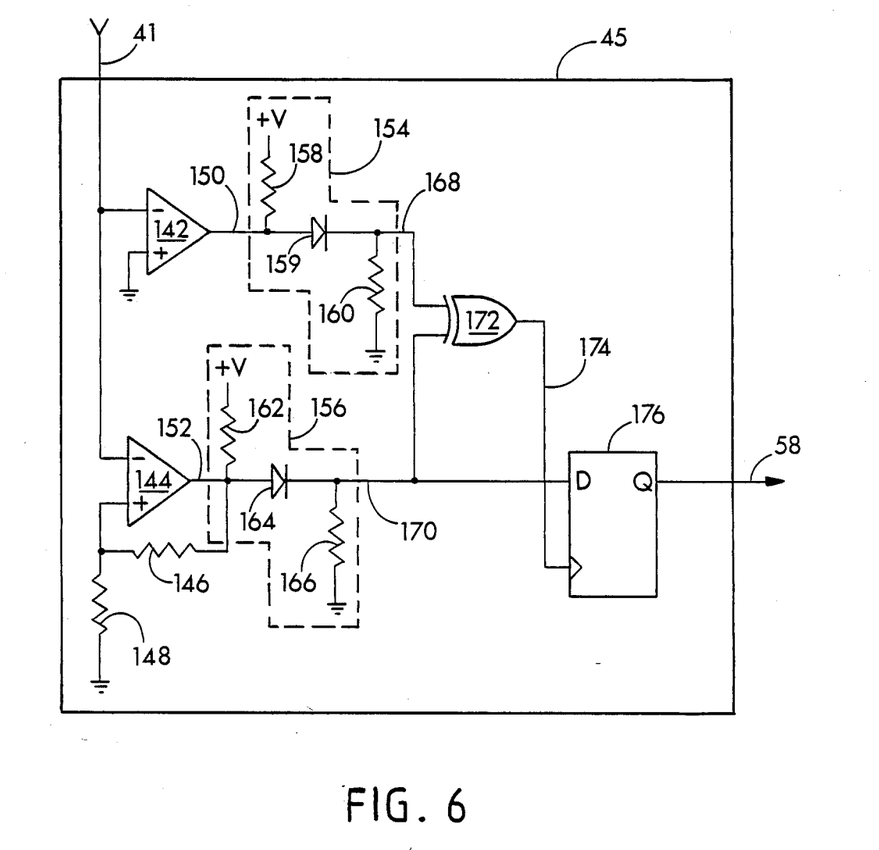
FIG. 6 is a schematic circuit diagram of an exemplary zero crossing detection circuit which may be used in the present invention.

FIG. 6 shows an example of the zero crossing detection circuit discussed above. The sinusoidally varying signal representing the intensity of the light wave detected by the laser detector 42 is carried on the line 41. The signal on the line 41 is applied to a bipolar trigger comparator 142 and a bipolar steering comparator 144. A second input to the bipolar trigger comparator 142 is grounded. The bipolar steering comparator 144 has bipolar hysteresis provided by feedback resistors 146 and 148. The bipolar trigger comparator 142 has no hysteresis. The outputs of the comparators 142 and 144 are carried on lines 150 and 152 and fed into logic level translators 154 and 156, respectively, which are indicated by dashed boxes in FIG. 6. The function of the translators 154 and 156 is to translate the bipolar swing from the outputs of the comparators 142 and 144 into a swing that is compatible with the remaining logic circuitry. The translator 154 has a resistor 158 extending from the line 150 tied to a high state (+V), a diode 159, and a resistor 160 extending from the line 150, that is grounded. The translator 156 is similarly equipped with resistor 162, diode 164, and resistor 166. The translated output signal from the comparator 142 is carried on a line 168 and the translated output signal from the comparator 144 is carried on a line 170. The lines 168 and 170 are provided to an exclusive-OR gate 172, the output of which is carried on a line 174 and forms the appropriate clock signal for a D-type flip-flop 176. Line 170 is fed into the data input of the flip-flop 176 and the output from the flip-flop 176 on the line 58 is the pulsed output signal that is carried into that portion of the circuit that is dedicated to discriminating the direction of the moving mirror 20 of the FTIR spectrometer. The zero crossing detection circuit 46 is identical to the circuit 45, receiving the signal on the line 43 instead of on line 41, and producing the output on the line 62 instead of on the line 58.

It is understood that the invention is not confined to the particular embodiments herein illustrated and described, but embraces such modified forms thereof as come within the scope of the following claims.

What is claimed is:

1. Apparatus for use in determining the position of the moving mirror in a Fourier-transform infrared spectrometer of the type which includes an interferometer with a moving mirror, a laser which directs its beam into the interferometer, a laser detector for detecting the intensity of the laser light exiting from the interferometer, and a microcomputer system adapted to utilize information on the postion of the moving mirror to control the motion of the moving mirror and to correlate the position of the moving mirror with the signal obtained from an infrared detector in the spectrometer, comprising:

(a) incremental counter means, connected to the laser detector and to the microcomputer, for counting pulses from the laser detector up or down in response to an up or down control signal and having a maximum bit capacity, with the count kept by the counter means returning to zero when the maximum bit capacity of the counter means is exceeded or returning to the maximum bit capacity number when the count in the counter means is decremented below zero, the output of the counter means being connected to the microcomputer system for access by the microcomputer system; and (b) means connected to the laser light detector for discriminating the direction of motion of the moving mirror in the FTIR spectrometer and providing an up control signal to the incremental counter means when the moving mirror is moving in one direction and a down control signal to the incremental counter means when the moving mirror is moving in the other direction.

2. The apparatus of claim 1 including latch means, connected between the incremental counter means and the microcomputer system, for responding to a control signal to load and hold the output count from the incremental counter means in response to the control signal, and timing control means connected to the latch means for providing an enable control signal to the latch means to cause the latch means to load new data from the incremental counter means in a time period which is less than the time required for the incremental counter means to advance one-half of its maximum number of counts.

3. The apparatus of claim 2 wherein the means for discriminating the direction of the moving mirror is connected to the microcomputer system, wherein the incremental counter means is capable of counting in only one direction, and wherein the incremental counter means is cleared upon a change in direction of the moving mirror and the timing control means provides an additional control signal when the moving mirror changes direction.

4. The apparatus of claim 1 including latch means, connected between the incremental counter means and the microcomputer system, for responding to a control signal to load and hold the output count from the incremental counter means in response to the control signal, and control means connected to the latch means for providing an enable control signal to the latch means to cause the latch means to load new data from the incremental counter means when maximum bit capacity of the counter means is exceeded or when the count in the counter means is decremented below zero.

5. The apparatus of claim 1 wherein the incremental counter means includes a plurality of up/down counters connected in a cascaded configuration with the lowest significant bit input of each counter except the least significant bit counter connected to receive the overflow bit from the next least significant bit counter.

6. The apparatus of claim 1 wherein the laser detector includes two separate detectors arranged such that the detectors provide output pulse signals which are out of phase with each other and with the output of one detector leading the output of the other detector when the moving mirror is moving in one direction and trailing when the moving mirror is moving in the opposite direction, the means for discriminating the direction of motion connected to the two detectors to determine which detector is providing a pulse signal which is leading the other detector and providing a high output signal if a first of the detectors is leading and a low output signal if the second of the detectors is leading.

7. The apparatus of claim 1 wherein the microcomputer has a random access memory and maintains an absolute position count in its memory of the sum of the existing content of its memory with the new incremental count, either positive or negative, obtained from the incremental counter means.

8. The apparatus of claim 7 wherein the absolute position count is updated when the incremental counter means is accessed by the microcomputer.

9. An infrared spectrometer comprising:
(a) a Michelson interferometer with a moving mirror;
(b) a positioning laser having a light beam directed into the interferometer;
(c) a laser detector for detecting the intensity of laser light exiting from the interferometer;
(d) an infrared detector for detecting the intensity of infrared exiting from the spectrometer;
(e) a microcomputer system having an absolute positive register in its memory for storing the position of the moving mirror and adapted to utilize information on the position of the moving mirror to control the motion of the moving mirror and to correlate the position of the moving mirror with the signal obtained from the infrared detector in the spectrometer;
(f) incremental counter means connected to the laser detector and to the microcomputer for counting pulses from the laser detector and having a maximum bit capacity, the output of the counter means being connected to the microcomputer system for access by the microcomputer system;
(g) means, connected to the laser light detector for discriminating the direction of motion of the moving mirror in the FTIR spectrometer and providing an up control signal when the moving mirror is moving in one direction and a down control signal when the moving mirror is moving in the other direction; and
(h) means, receiving the up and down control signals from the means for discriminating the direction of motion, for coordinating the count of the incremental counter means with the up and down control signals to properly increment or decrement the absolute position count maintained in the absolute position register of the microcomputer system.

10. The infrared spectrometer of claim 9 including latch means, connected between the incremental counter means and the microcomputer system, for responding to a control signal to load and hold the output count from the incremental counter means in response to the control signal, and timing control means connected to the latch means for providing an enable control signal to the latch means to cause the latch means to load new data from the incremental counter means in a time period which is less than the time required for the incremental counter means to advance one-half of its maximum number of counts.

11. The infrared spectrometer of claim 9 wherein the incremental counter means responds to the up or down control signal to count up to a maximum bit capacity and then return to zero or to count down to zero and then return to a maximum bit capacity.

12. The infrared spectrometer of claim 11 including latch means, connected between the incremental counter means and the microcomputer system, for responding to a control signal to load and hold the output count from the incremental counter means in response to the control signal, and control means connected to the latch means for providing an enable control signal to the latch means to cause the latch means to load new data from the incremental counter means when maximum bit capacity of the counter means is exceeded or when the count in the counter means is decremented below zero.

13. The infrared spectrometer of claim 11 wherein the incremental counter means includes a plurality of up/down counters connected in a cascaded configuration with the lowest significant bit input of each counter except the least significant bit counter connected to receive the overflow bit from the next least significant bit counter.

14. The infrared spectrometer of claim 9 wherein the means for discriminating the direction of the moving mirror is connected to the microcomputer system, wherein the incremental counter means is capable of counting in only one direction, and wherein the incremental counter means is cleared upon a change in direction of the moving mirror and the timing control means provides an additional control signal when the moving mirror changes direction.

15. The infrared spectrometer of claim 9 wherein the laser detector includes two separate detectors arranged such that the detectors provide output pulse signals which are out of phase with each other and with the output of one detector leading the output of the other detector when the moving mirror is moving in one direction and trailing when the moving mirror is moving in the opposite direction, the means for discriminating the direction of motion connected to the two detectors to determine which detector is providing a pulse signal which is leading the other detector and providing a high output signal if a first of the detectors is leading and a low output signal if the second of the detectors is leading.

16. The infrared spectrometer of claim 9 wherein the microcomputer has a random access memory and maintains an absolute position count in its memory of the sum of the existing content of its memory with the new incremental count, either positive or negative, obtained from the incremental counter means.

17. The infrared spectrometer of claim 16 wherein the absolute position count is updated when the incremental counter means is accessed by the microcomputer.

18. A method of tracking the position of a moving mirror in a Fourier-transform infrared spectrometer interferometer comprising the steps of:
   (a) directing the light beam of a laser into the interferometer;
   (b) detecting the pulses of the laser light exiting from the interferometer with a laser detector;
   (c) discriminating the direction of motion of the moving mirror from the detected laser light pulses and producing an up control signal when the moving mirror is moving in one direction and a down control signal when the moving mirror is moving in the other direction;
   (d) counting the pulses detected from the laser detector up or down in response to the up or down control signal with an incremental counter connected to the laser detector, the incremental counter having a maximum bit capacity, with the count kept by the incremental counter returning to zero when the maximum bit capacity of the counter is exceeded or returning to the maximum bit capacity number when the count in the counter is decremented below zero, the counter producing an output;
   (e) accessing the output of the counter with a microcomputer system at a rate such that the period of time between accessing the microcomputer system is less than the period of time required for the incremental counter to advance one half of its maximum number of counts.

19. The method of claim 18 wherein the microcomputer has a random access memory and maintains an absolute position count in its memory of the sum of the existing content of its memory with the new incremental count, either positive or negative, obtained from the incremental counter means.

20. The method of claim 19 further comprising the step of updating the absolute position count of the microcomputer when the output of the counter is accessed by the microcomputer.

* * * * *